(12) United States Patent
Saichi et al.

(10) Patent No.: US 8,416,524 B2
(45) Date of Patent: Apr. 9, 2013

(54) SPINDLE MOTOR HAVING CONNECTING MECHANISM CONNECTING LEAD WIRE AND CIRCUIT BOARD, AND STORAGE DISK DRIVE HAVING THE SAME

(75) Inventors: Masayoshi Saichi, Kyoto (JP); Kazuhiko Fukushima, Kyoto (JP); Hironori Ando, Kyoto (JP); Kazushi Miura, Kyoto (JP); Katsuya Takahashi, Kyoto (JP); Takehito Tamaoka, Kyoto (JP); Jonathan M. Garbarino, San Jose, CA (US); Robert N. Lion, Redwood City, CA (US)

(73) Assignees: Nidec Corporation, Kyoto (JP); Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/029,143

(22) Filed: Feb. 17, 2011

(65) Prior Publication Data

US 2011/0249362 A1    Oct. 13, 2011

Related U.S. Application Data

(60) Provisional application No. 61/407,157, filed on Oct. 27, 2010.

(30) Foreign Application Priority Data

Apr. 7, 2010   (JP) .................................. 2010-088830
Sep. 29, 2010  (JP) .................................. 2010-219590

(51) Int. Cl.
    *G11B 19/20*    (2006.01)
(52) U.S. Cl.
    USPC ........................................................ 360/99.08
(58) Field of Classification Search ................ 360/99.08
    See application file for complete search history.

(56) References Cited

U.S. PATENT DOCUMENTS 5,572,381 A    11/1996   Stewart
6,118,198 A     9/2000   Hollenbeck et al.
    (Continued)

FOREIGN PATENT DOCUMENTS

JP    07-075275 A    3/1995
JP    07-107693 A    4/1995
    (Continued)

OTHER PUBLICATIONS

Sekii et al., "Spindle Motor and Disk Drive Apparatus", U.S. Appl. No. 12/952,319, filed Nov. 23, 2010.

(Continued)

*Primary Examiner* — Mark Blouin
(74) *Attorney, Agent, or Firm* — Keating & Bennett, LLP

(57) ABSTRACT

A spindle motor includes a base portion, a rotor hub, a stator, and a circuit board. The base portion preferably includes a through hole and is arranged to spread out radially around a central axis. The rotor hub is arranged above the base portion to rotate about the central axis. The stator is arranged above the base portion, and includes coils each including at least one lead wire. The circuit board is arranged radially outward of the through hole, and arranged on a lower surface of the base portion. The base portion includes a communicating groove arranged to join the through hole and the circuit board to each other. The at least one lead wire of the coils is arranged to pass inside the through hole and the communicating groove to be electrically connected to the circuit board. The through hole is sealed with a sealant.

36 Claims, 11 Drawing Sheets

U.S. PATENT DOCUMENTS

| | | |
|---|---|---|
| 6,652,324 B2 | 11/2003 | Maiers et al. |
| 6,771,460 B2 | 8/2004 | Tsuyuki et al. |
| RE38,772 E * | 8/2005 | Elsasser et al. ............ 360/98.07 |
| 7,012,191 B1 | 3/2006 | Watanabe et al. |
| 7,105,963 B2 | 9/2006 | Ito et al. |
| 7,144,275 B2 | 12/2006 | Iida |
| 7,254,882 B2 | 8/2007 | Ito et al. |
| 7,684,146 B1 | 3/2010 | Andrikowich et al. |
| 7,757,378 B1 | 7/2010 | Mann et al. |
| 8,139,316 B2 * | 3/2012 | Tashiro et al. ............ 360/97.12 |
| 8,164,851 B2 | 4/2012 | Yoneda et al. |
| 2001/0006442 A1 | 7/2001 | Komatsu et al. |
| 2005/0206255 A1 * | 9/2005 | Yoshino et al. ................. 310/71 |
| 2006/0002339 A1 | 1/2006 | Niwano |
| 2006/0023339 A1 | 2/2006 | Fukuyama et al. |
| 2006/0138886 A1 | 6/2006 | Ito et al. |
| 2006/0281229 A1 | 12/2006 | Koh et al. |
| 2009/0195095 A1 | 8/2009 | Yawata et al. |
| 2009/0316299 A1 * | 12/2009 | Tashiro et al. ............ 360/97.02 |
| 2011/0122530 A1 | 5/2011 | Sekii et al. |

FOREIGN PATENT DOCUMENTS

| | | |
|---|---|---|
| JP | 07-222386 A | 8/1995 |
| JP | 07-334967 A | 12/1995 |
| JP | 11-218128 A | 8/1999 |
| JP | 2000-209804 A | 7/2000 |
| JP | 2000-306319 A | 11/2000 |
| JP | 2001-067775 A | 3/2001 |
| JP | 2005-057892 A | 3/2005 |
| JP | 2005-210787 A | 8/2005 |
| JP | 2006-040423 A | 2/2006 |
| JP | 2006-100252 A | 4/2006 |
| JP | 2006-185553 A | 7/2006 |
| JP | 2009-110611 A | 5/2009 |
| JP | 2009-189157 A | 8/2009 |
| JP | 2010-009644 A | 1/2010 |

OTHER PUBLICATIONS

Yawata et al., "Spindle Motor and Storage Disk Drive Apparatus", U.S. Appl. No. 12/849,868, filed Aug. 4, 2010.

Yawaya et al., "Spindle Motor and Storage Disk Drive Apparatus", U.S. Appl. No. 13/352,422, filed Jan. 18, 2012.

Yawata et al., "Spindle Motor and Storage Disk Drive Apparatus", U.S. Appl. No. 13/352,445, filed Jan. 18, 2012.

Sugi et al.,"Spindle Motor, Disk Drive Apparatus, and Method of Manufacturing Spindle Motor", U.S. Appl. No. 13/241,773, filed Sep. 23, 2011.

Sugi et al ,"Motor Unit and Disk Drive Apparatus", U.S. Appl. No. 13/290,209, filed Nov. 7, 2011.

Sugi et al.,"Spindle Motor, and Disk Drive Apparatus Including the Spindle Motor", U.S. Appl. No. 13/334,620, filed Dec. 22, 2011.

Matsuyama et al.,"Spindle Motor, Disk Drive Apparatus, and Method of Manufacturing Spindle Motor", U.S. Appl. No. 13/424,632, filed Mar. 20, 2012.

Watanabe, "Method of Manufacturing Motor, Motor, and Disk Drive Apparatus", U.S. Appl. No. 13/437,103, filed Apr. 2, 2012.

Watanabe et al., "Spindle Motor and Disk Drive Apparatus", U.S. Appl. No. 61/625,128, filed Apr. 17, 2012.

Watanabe et al., "Base Unit, Spindle Motor, and Disk Drive Apparatus", U.S. Appl. No. 61/625,132, filed Apr. 17, 2012.

Yawata, "Spindle motor, Disk Drive Apparatus, and Method of Manufacturing Spindle Motor," U.S. Appl. No. 13/365,286, filed Feb. 3, 2010.

* cited by examiner

60

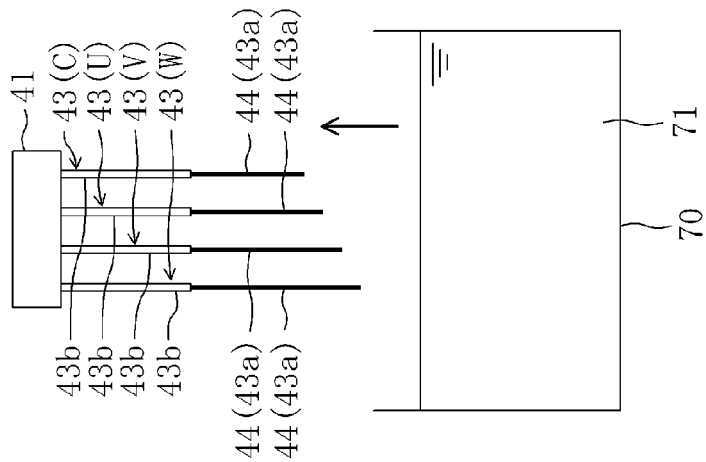
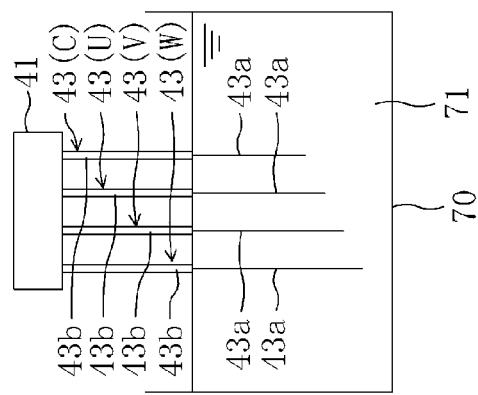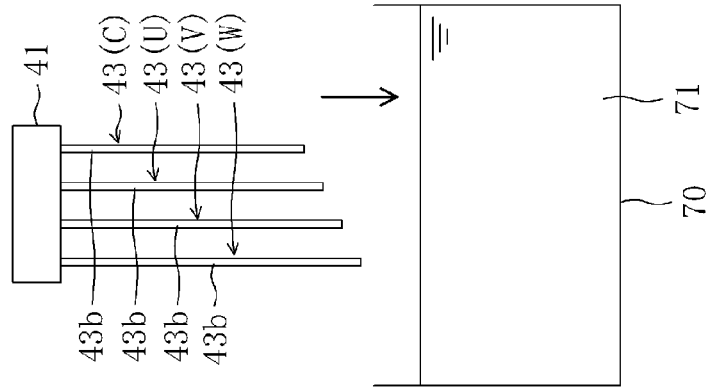

SPINDLE MOTOR HAVING CONNECTING MECHANISM CONNECTING LEAD WIRE AND CIRCUIT BOARD, AND STORAGE DISK DRIVE HAVING THE SAME

BACKGROUND OF THE INVENTION

1. Field of the Invention

The present invention relates to a spindle motor and more specifically to a hard disk drive apparatus including the spindle motor.

2. Description of the Related Art

In a motor designed for a disk drive described, as shown in JP-A 2000-209804, lead wires from coils are electrically connected to a flexible circuit board through a lead wire-use hole in a motor bracket. The lead wire-use hole is closed by the flexible circuit board. The flexible circuit board is adhered to a bottom surface of the motor bracket through a gluing agent.

However, in a structure in which soldering is performed on the bottom surface of the motor bracket, as with the structure described in JP-A 2000-209804, there is a need to shave the bottom surface of the motor bracket, taking into consideration an area where the circuit board is adhered and the height of solder. This may, however, lead to a reduction in rigidity of the motor bracket as a result of a reduction in thickness of that portion of the motor bracket at which the shaving has been performed.

SUMMARY OF THE INVENTION

A spindle motor according to a preferred embodiment of the present invention includes a base portion, a rotor hub, a stator, and a circuit board. The base portion preferably includes a through hole and is arranged to spread out radially around a central axis. The rotor hub is arranged above the base portion to rotate about the central axis. The stator is arranged above the base portion, and includes coils including at least one lead wire. The circuit board is arranged radially outward of the through hole, and arranged on a lower surface of the base portion. The base portion preferably includes a communicating groove arranged to join the through hole and the circuit board to each other. The at least one lead wire of the coils is arranged to pass inside the through hole and the communicating groove to be electrically connected to the circuit board. The through hole is preferably sealed with a sealant.

Another spindle motor according to a preferred embodiment of the present invention includes a base portion, a rotor hub, a stator, and a circuit board. The base portion preferably includes a plurality of through holes and is arranged to spread out radially around a central axis. The rotor hub is arranged above the base portion to rotate about the central axis. The stator is arranged above the base portion, and includes coils including at least one lead wire. The circuit board is arranged on a lower surface of the base portion, and includes at least one pad portion. The base portion includes a plurality of recessed portions. Each of the recessed portions is arranged to have at least one of the through holes arranged therein. The at least one lead wire is arranged to pass through the through holes to reach the lower surface of the base portion, and to be electrically connected to the at least one pad portion of the circuit board.

According to various preferred embodiments of the present invention, portions of the lower surface of the base portion which correspond to the lead wire(s) are preferably shaved off to define the recessed portion(s) and the communicating groove(s) in the lower surface of the base portion. Therefore, the total amount of a portion of the base portion which is shaved off can be reduced as compared to conventional techniques, and a sufficient rigidity of the base portion can also be secured.

Also, portions of the lower surface of the base portion which correspond to the lead wire(s) are shaved off to define the plurality of recessed portions in the lower surface of the base portion. Therefore, the total amount of a portion of the base portion which is shaved off can be reduced as compared to conventional techniques, and a sufficient rigidity of the base portion can thereby be secured.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A, 5B, and 5C are schematic diagrams illustrating a solder dipping process for lead wires according to a preferred embodiment of the present invention.

DETAILED DESCRIPTION OF THE PREFERRED EMBODIMENTS

Hereinafter, preferred embodiments of the present invention will be described with reference to the accompanying drawings. Note that the preferred embodiments described below are only meant to be illustrative of the present invention, and not to restrict the scope of the present invention, applications thereof, or purposes thereof.

Figure 1:
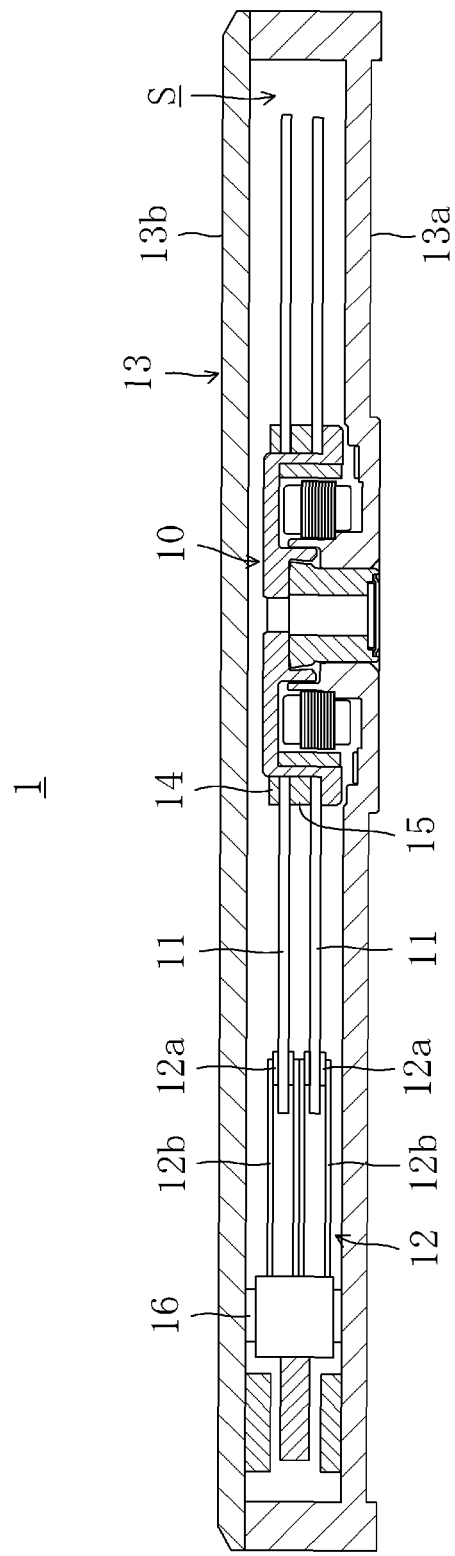
FIG. 1 is a schematic cross-sectional view illustrating the structure of a hard disk drive apparatus including a spindle motor according to a first preferred embodiment of the present invention.

FIG. 1 is a schematic cross-sectional view illustrating the structure of a hard disk drive apparatus 1 including a spindle motor 10 according to a first preferred embodiment of the present invention. As illustrated in FIG. 1, the hard disk drive apparatus 1 preferably includes disc-shaped recording disks 11, on which information is recorded, an access portion 12, the spindle motor 10 (hereinafter referred to as the "motor 10"), and a housing 13. The access portion 12 is preferably arranged to read and/or write information from or to any of the recording disks 11. The motor 10 is preferably arranged to rotate the recording disks 11. The housing 13 is preferably arranged to contain the recording disks 11, the access portion 12, and the motor 10. The motor 10 is preferably a three-phase brushless motor, however, any other desirable type of motor can be used.

Note that it is assumed in the present specification that terms "upper side" or the like and "lower side" or the like are used to refer to, respectively, an upper side and a lower side in a direction along a central axis J1 in the accompanying drawings. Also note that terms referring to "upward", "downward", "left", "right", etc., as used in the description of the preferred embodiments to describe relative positions or directions of different members are simply used with reference to the accompanying drawings, and should not be construed as describing relative positions or directions of those members when actually installed in a device.

The housing 13 preferably includes a first housing portion 13a and a flat second housing portion 13b, which is arranged to cover an opening of the first housing portion 13a. The first housing portion 13a preferably includes the opening on an upper side thereof. The motor 10 and the access portion 12 are preferably arranged on an inner bottom surface of the first housing portion 13a. An interior space S of the housing 13 is preferably a clean space with an extremely small amount of, or no, dirt or dust. A gas is preferably present in the interior space S. Examples of the gas include, for example, air and helium.

The recording disks 11 are preferably mounted above the motor 10, and are supported on the motor 10 through a clamper 14 and a ring-shaped spacer 15.

The access portion 12 preferably includes magnetic heads 12a, arms 12b arranged to support the magnetic heads 12a, and a head actuator mechanism 16. Each magnetic head 12a is preferably arranged in the vicinity of one of the recording disks 11 to magnetically read and/or write information from or to the disk 11. The head actuator mechanism 16 is preferably arranged to move each arm 12b to thereby move the corresponding head 12a relative to the recording disks 11 and the motor 10. The head 12a is thereby arranged to access a desired location on the rotating recording disk 11 while being in the vicinity of the recording disk 11, to read and/or write information from or to that location.

Figure 2:
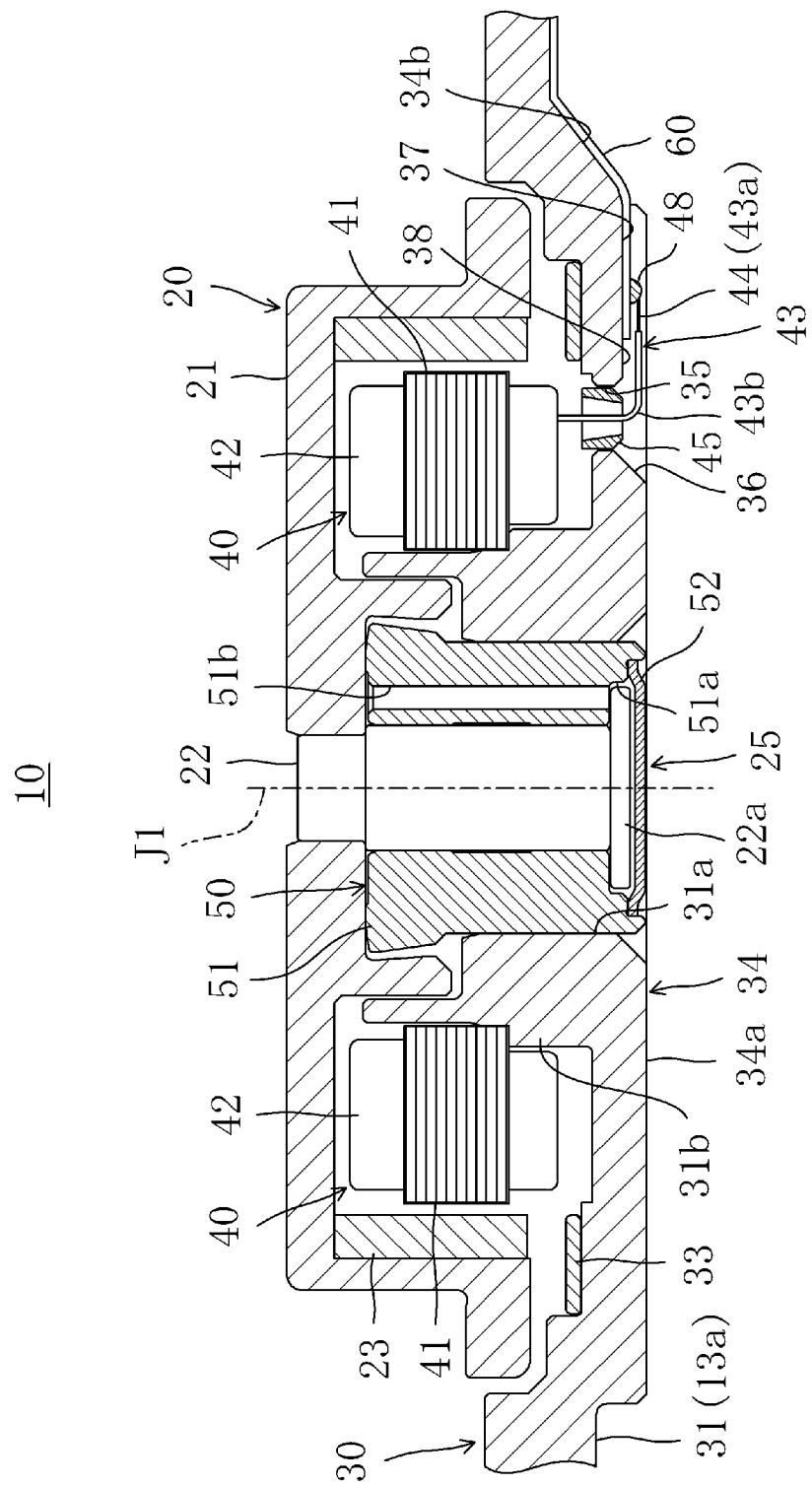
FIG. 2 is a schematic cross-sectional view illustrating the structure of the spindle motor.

FIG. 2 is a schematic cross-sectional view illustrating the structure of the spindle motor 10. As illustrated in FIG. 2, the motor 10 is preferably an outer-rotor motor, and includes a rotor portion 20 and a stator portion 30.

The rotor portion 20 is supported to be rotatable with respect to the stator portion 30, through a fluid dynamic bearing 25 using a fluid. Examples of the fluid include, for example, gas and liquid. The rotor portion 20 preferably includes a rotor hub 21; a shaft 22, which is arranged at the center of the rotor hub 21; and a rotor magnet 23, which is fixed to the rotor hub 21 and arranged to surround the central axis J1.

The shaft 22 is preferably fixed to a central portion of the rotor hub 21 through, for example, press fit, adhesion, or any other desired methods.

A lower end portion of the shaft 22 includes a substantially annular flange portion 22a. The rotor magnet 23 is preferably an annular magnet with multiple magnetic poles, and is arranged to generate a rotational torque centered on the central axis J1 in relation to a stator 40, which will be described below.

The stator portion 30 preferably includes a base plate 31, the stator 40, and a thrust yoke 33. The base plate 31 preferably includes a hole portion 31a and a holder 31b. The stator 40 is preferably arranged outside an outer circumference of the holder 31b. The thrust yoke 33 is preferably arranged on the base plate 31 to be opposed to the rotor magnet 23. The thrust yoke 33 is preferably arranged to produce a magnetic attraction force in relation to the rotor magnet 23, so that the rotor portion 20 receives a force directed downward (i.e., toward the stator portion 30).

The base plate 31 is preferably made of, for example, an aluminum alloy or the like, and defines a portion of the housing 13 of the hard disk drive apparatus 1 in which the motor 10 is arranged. A mechanism including the access portion 12 and so on (see FIG. 1) is preferably arranged on the base plate 31. A substantially cylindrical sleeve portion 50 is preferably arranged in the hole portion 31a. The stator 40 preferably includes a core 41 and coils 42, which are wound on the core 41.

The sleeve portion 50 preferably includes a sleeve 51, which is provided substantially in the shape of a cylinder and centered on the central axis J1, and a substantially disc-shaped seal cap 52, which is arranged to close a lower opening of the sleeve 51. The sleeve 51 and the seal cap 52 are made, for example, of stainless steel or the like.

A bottom portion of the sleeve 51 preferably includes a shoulder portion 51a, which is recessed upward. The seal cap 52 is preferably fixed to the sleeve 51 through an adhesive or the like so as to cover the shoulder portion 51a. The flange portion 22a of the shaft 22 is preferably arranged inside the shoulder portion 51a.

The sleeve 51 preferably includes a communicating hole 51b passing therethrough in an axial direction and positioned radially outward of the central axis J1. The communicating hole 51b is preferably arranged in communication with a gap defined between the seal cap 52 and the shoulder portion 51a at the bottom portion of the sleeve 51.

Inside the sleeve portion 50, minute gaps are preferably defined between an inner circumferential surface of the sleeve 51 and an outer circumferential surface of the shaft 22, between the sleeve 51 and an upper surface and an outer circumferential surface of the flange portion 22a, and between an upper surface of the seal cap 52 and a lower surface of the flange portion 22a. A lubricant, which is preferably used as the fluid, is continuously arranged in these minute gaps. The bearing mechanism 25 of the motor 10 is preferably defined by the sleeve 51, the seal cap 52, the shaft 22, and the lubricant. The shaft 22 is preferably supported by the lubricant such that the shaft 22 will not contact the sleeve portion 50 during rotation. The rotor portion 20 and the recording disks 11 supported by the rotor portion 20 are preferably caused to rotate with respect to the stator portion 30 with high accuracy and low noise. Note that a lubricating oil is preferably used as the lubricant.

Figure 3:
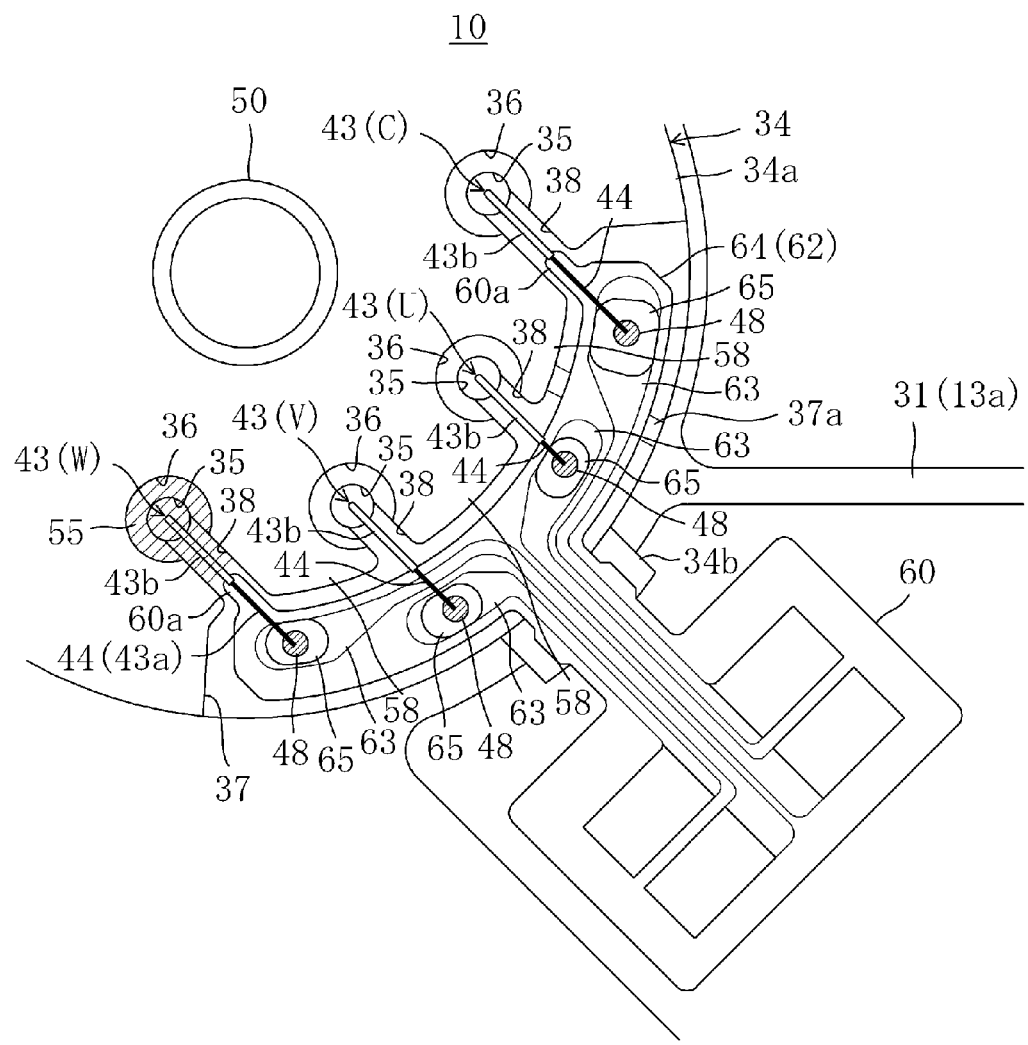
FIG. 3 is a schematic plan view illustrating the structure of the spindle motor.

As also illustrated in FIG. 3, a lower surface of the base plate 31 preferably includes a thick base portion 34 arranged to spread out radially around the central axis J1. In a case where a three phase motor is used, the base portion 34 preferably includes four through holes 35 corresponding to four lead wires 43 (W phase, V phase, U phase, and common) drawn from the coils 42 of the stator 40. An insulating bushing 45 is preferably arranged in each through hole 35. Each through hole preferably has only one of the lead wires 43 passing therethrough. This arrangement facilitates an operation of connecting the lead wires 43 to a circuit board 60 through soldering. Each insulating bushing 45 is preferably fixed to an inner circumferential surface of a portion of the base portion 34 which defines the corresponding through hole 35 through press fit or other methods. A gap may be defined between each insulating bushing 45 and a corresponding inner circumferential surface of the base portion 34. Each coil 42 and the corresponding lead wire 43 are preferably defined by a single member.

In the case where a plurality of lead wires are drawn out through one through hole, an operation will be required to identify an appropriate lead wire for each phase of the circuit board, which may lead to decreased workability. In contrast, in this preferred embodiment, each through hole 35 has only one lead wire passing therethrough, and it is therefore easy to identify an appropriate lead wire 43 corresponding to each phase of the circuit board 60, leading to easier soldering. Note that, of the lead wires 43, the common wire is preferably made up of three wires twisted together, which is regarded as one lead wire 43.

A lower opening portion of a portion of the base portion 34 at which each through hole 35 is defined preferably includes a recessed portion 36 with a diameter that is greater than a diameter of the through hole 35. Specifically, each recessed portion 36 preferably includes a shape which has a diameter gradually increasing in a downward direction. Each recessed portion 36 preferably includes a separate one of the through holes 35 arranged therein. A wall portion 58 is preferably arranged circumferentially between each pair of adjacent through holes 35 to divide the recessed portions 36.

The base portion 34 preferably includes a bottom portion 34a, which includes the through holes 35, and a side wall portion 34b, which is arranged to extend upward from an outer circumferential portion of the bottom portion 34a. The bottom portion 34a preferably includes an accommodating portion 37 and communicating grooves 38. The accommodating portion 37 is preferably positioned radially outward of the through holes 35 and depressed upward. Each of the communicating grooves 38 is preferably joined to a separate one of the recessed portions 36 and the accommodating portion 37. The communicating grooves 38 are preferably arranged to be substantially flush with the recessed portions 36 and the accommodating portion 37. The accommodating portion 37 is preferably arranged to extend in a circumferential direction. Since the accommodating portion 37 is arranged radially outward of the through holes 35, the total amount of a portion of the bottom portion which is shaved off can be reduced, leading to a much smaller decrease in a rigidity of the base portion 34, as compared to the case where the accommodating portion is arranged in the vicinity of the through holes.

In addition, when the accommodating portion 37 is arranged in a relatively thick portion of the bottom portion 34a, a decrease in the rigidity of the base portion 34 can be reduced. In this preferred embodiment, such a thick portion thereof is preferably arranged to overlap with the thrust yoke 33 in the axial direction, for example.

Portions of a lower surface of the base portion 34 which correspond to the lead wires 43 are shaved off to define the recessed portions 36 and the communicating grooves 38 in the lower surface of the base portion 34. Therefore, the total amount of a portion of the base portion 34 which is shaved off can be reduced as compared to conventional techniques, and a sufficient rigidity of the base portion 34 can be secured. Note that the size of each recessed portion 36 is preferably a minimum size that will allow the lead wire 43 to be drawn out smoothly through the through hole 35, and that the recessed portion 36 of the minimum size will contribute to further reducing the total amount of the portion of the base portion 34 which is shaved off.

The accommodating portion 37 preferably includes a slope portion 37a preferably arranged to slope upward in a circumferential direction of the base portion 34. The depth of depression of a portion of the accommodating portion 37 which is arranged on a side of the slope portion 37a where the common wire is arranged is greater than that of a portion of the accommodating portion 37 which is arranged on an opposite side of the slope portion 37a, where the other lead wires 43 are arranged. As discussed above, the common wire is preferably made up of three wires twisted together which is regarded as one lead wire 43, and therefore has a diameter greater than the diameter of any other lead wire 43. The depth of depression of a portion of the accommodating portion 37 where the common wire is drawn out is preferably arranged to be large enough to prevent the common wire from protruding above the lower surface of the base portion 34.

A surface of the base plate 31 including the recessed portions 36 and the communicating grooves 38 preferably includes an electrodeposition coating layer. The electrodeposition coating layer preferably includes a thickness of about several micrometers (μm) to achieve effective insulation properties.

A portion of the flexible circuit board 60 (hereinafter referred to as the "circuit board 60") is preferably arranged in the accommodating portion 37. Specifically, pad portions 65 of the circuit board 60, which are arranged to be connected with the lead wires 43 from the coils 42, are arranged in the accommodating portion 37.

Figure 4:
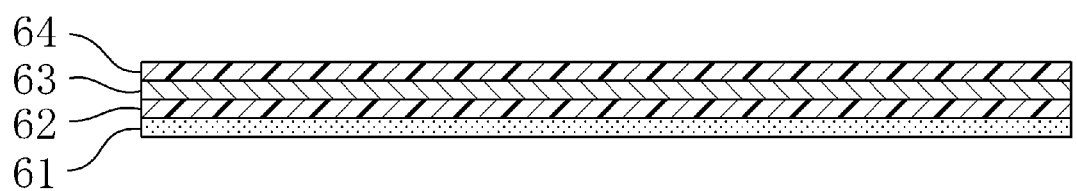
FIG. 4 is a schematic vertical cross-sectional view illustrating the structure of a circuit board according to a preferred embodiment of the present invention.

As illustrated in FIG. 4, the circuit board 60 preferably includes an adhesive layer 61, a first insulating layer 62, a conductive layer 63, and a second insulating layer 64. The first insulating layer 62 is preferably arranged on the adhesive layer 61. The conductive layer 63 is arranged on the first insulating layer 62 and to be electrically connected with the lead wires 43. The second insulating layer 64 is preferably arranged to cover some portions of the conductive layer 63 while exposing the other portions thereof. The pad portions 65 preferably include portions of the conductive layer 63. The circuit board 60 is preferably arranged along the lower surface of the base plate 31 and the side wall portion 34b. The pad portions 65 are preferably arranged in the accommodating portion 37. The circuit board 60 is preferably adhered to the lower surface of the base plate 31 through the adhesive layer 61. The first and second insulating layers 62 and 64 are preferably made of polyimide or the like, for example. The conductive layer 63 is preferably made of copper foil or the like, for example.

Here, as illustrated in FIG. 3, each of the first insulating layer 62 and the second insulating layer 64 includes projecting portions 60a arranged in the vicinity of the pad portions 65 corresponding to the W phase and common lead wires 43 from the coils 42, each projecting portion 60a extending in the direction of the corresponding through hole 35. Each projecting portion 60a is preferably arranged inside the corresponding communicating groove 38. Each projecting portion 60a is preferably arranged between the base plate 31 and a coating removed portion 44 of the corresponding lead wire 43. This arrangement preferably enables the portions of the first and second insulating layers 62 and 64 which are positioned between the base plate 31 and the coating removed portion 44 of the lead wire 43 to prevent the lead wire 43 from coming into contact with the base plate 31 to cause an electrical connection, i.e., a short.

In addition, portions of the surface of the base plate 31 which define the recessed portions 36 and the communicating grooves 38 are preferably coated with the aforementioned electrodeposition coating layer. The electrodeposition coating layer will preferably prevent any lead wire from coming into contact with the base plate 31 so as to avoid any electrical connection between the lead wires and the base plate 31. In particular, the coating of the portions of the surface of the base plate 31 which define the communicating grooves 38 with the electrodeposition coating layer will contribute to further ensuring the prevention of an electrical connection between any lead wire 43 and the base plate 31, because the first and second insulating layers 62 and 64 and the electrodeposition coating layer will then be arranged between the base plate 31 and the coating removed portions 44.

A portion of the base plate 31 which defines the accommodating portion 37 is also preferably coated with the electrodeposition coating layer. Each projecting portion 60*a* may be defined by only the first insulating layer 62, or by only the second insulating layer 64.

Each coil 42 of the stator 40 preferably includes a conducting wire 43*a* and an insulating coating 43*b* with which the conducting wire 43*a* is coated. A top end portion of the lead wire 43 of the coil 42 preferably includes the coating removed portion 44, where the insulating coating 43*b* has been removed. The coating removed portion 44 preferably includes a solder layer. The solder layer is preferably arranged to coat a portion of the conducting wire 43*a* which is exposed as a result of the insulating coating 43*b* having been removed by a solder dipping process, which will be described below.

Each lead wire 43 is preferably arranged to pass through the insulating bushing 45 arranged in the corresponding through hole 35 defined in the base portion 34 and the corresponding communicating groove 38, and extend in substantially the same direction (e.g., in a direction diagonally to the lower right in FIG. 3) toward the circuit board 60. This arrangement enables an operation of arranging the lead wires 43 to be accomplished efficiently. The four lead wires 43 which are drawn over the lower surface of the base portion 34 are preferably held by use of a jig (not shown), and the jig is moved in the direction diagonally to the lower right toward the circuit board 60. This arrangement enables the four lead wires 43 to be simultaneously bent in the same direction to be arranged in the respective communicating grooves 38, with improved operating efficiency.

Each lead wire 43 is preferably soldered to the corresponding pad portion 65 of the circuit board 60, and thereby electrically connected to the circuit board 60. Here, the depth of depression of the accommodating portion 37 is preferably arranged to be greater than the sum of the thickness of the circuit board 60 and the thickness of a solder 48 (see FIG. 2). This will substantially prevent the solder 48 from protruding above the lower surface of the base portion 34.

The through holes 35 are preferably sealed with sealants 55, and the sealants 55 are arranged in the recessed portions 36 and the communicating grooves 38. The sealants 55 are preferably made of a thermosetting adhesive, for example, however, any other desirable sealant could be used. The sealants 55 are preferably arranged to secure the lead wires 43 fixedly in the through holes 35, the recessed portions 36, and the communicating grooves 38. Here, each recessed portion 36 is preferably shaped such as to gradually increase in diameter in the downward direction. This arrangement will enable the sealant 55 to easily settle near a lower opening portion of the through hole 35 when the sealant 55 is arranged in the recessed portion 36. Note that the sealant 55 may be made of any of various types of adhesives, such as an ultraviolet cure adhesive, instead of the thermosetting adhesive. Also note that the sealant may not necessarily be an adhesive, as long as an airtight seal can be achieved. For example, a non-adhesive sealant that is in a liquid or gel state when applied may be used.

Note that, while, of all the sealants 55, only the sealant 55 arranged in the through hole 35, the recessed portion 36, and the communicating groove 38 for the W phase is illustrated in FIG. 3 in order to make the lead wires 43 easy to see, the sealants 55 are in practice arranged in all of the through holes 35, the recessed portions 36, and the communicating grooves 38.

Because the circuit board 60 is preferably arranged in the accommodating portion 37, which is arranged radially outward of the through holes 35, the sealing of the through holes 35 with the sealants 55 is not interfered with by the circuit board 60 when the through holes 35 are sealed with the sealants 55. Moreover, airtightness can be achieved by sealing the through holes 35 with the sealants 55. This prevents a gas or the like from entering or exiting the interior of the housing 13 of the hard disk drive apparatus 1 through any through hole 35. In particular, a gas or the like that is present inside the housing 13 of the hard disk drive apparatus 1 is prevented from leaking out through any through hole 35. In the present preferred embodiment, helium is present inside the housing 13 though any other desirable gas could be used. Helium has a smaller molecular weight than air, and therefore tends to easily leak out through any through hole 35. The structure of the present preferred embodiment, however, prevents the helium from leaking out through any through hole 35.

Next, referring to FIGS. 5A, 5B, 5C, and 6, a procedure for electrically connecting the lead wires 43 of the stator 40 to the circuit board 60 will now be described below. First, the adhesive layer 61 of the circuit board 60 is preferably adhered to the lower surface of the base plate 31. In addition, the insulating bushings 45, each of which is substantially in the shape of a cylinder, are press fitted to the respective through holes 35 of the base plate 31.

FIGS. 5A to 5C are schematic diagrams illustrating the solder dipping process for the lead wires. As illustrated in FIG. 5A, the four lead wires 43, each of which has a different length, are drawn from end portions of the coils 42 of the stator 40. In FIG. 5A, the lead wire 43 for the W phase preferably has the greatest length, followed by the lead wire 43 for the V phase, followed by the lead wire 43 for the U phase, followed by the lead wire 43 for the common, which has the smallest length. The varied lengths of the lead wires 43 make it easy to identify the lead wire 43 for each phase of the circuit board 60, thereby facilitating a wiring operation and/or a soldering operation.

Next, as illustrated in FIG. 5B, each lead wire 43 is preferably dipped into a molten liquid solder 71 stored in a solder bath 70. As a result, a portion of the insulating coating 43*b* over each lead wire 43 which has been dipped in the liquid solder 71 is melted to expose the underlying conducting wire 43*a*. More specifically, each lead wire 43 consequently has a substantially equal length of the insulating coating 43*b* which is left unmelted, while at the same time the conducting wire 43*a* for the W phase has the greatest length, followed by the conducting wire 43*a* for the V phase, followed by the conducting wire 43*a* for the U phase, followed by the conducting wire 43*a* for the common, which has the smallest length. Thereafter, as illustrated in FIG. 5C, the stator 40 is moved upward, with the result that the top end portion of each lead wire 43 includes the coating removed portion 44 where the conducting wire 43*a* is coated with the solder layer.

Figure 6:
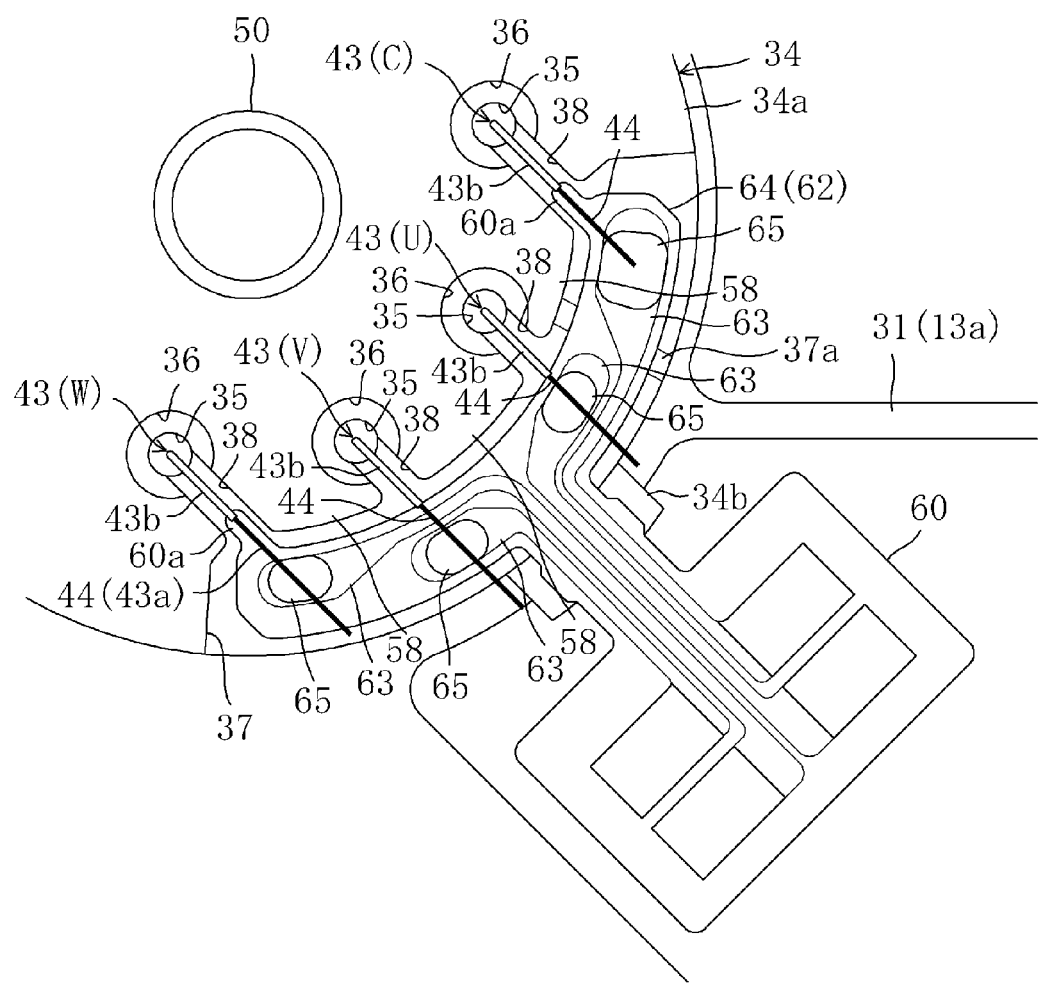
FIG. 6 is a schematic plan view illustrating a process of connecting the lead wires to the circuit board according to a preferred embodiment of the present invention.

Next, as illustrated in FIG. 6, each lead wire 43 is preferably inserted into the corresponding through hole 35 of the base plate 31, and the stator 40 is secured to the holder 31b of the base plate 31 through press fit or other methods. Next, the four lead wires 43, which have been drawn out to extend below the lower surface of the base portion 34 of the base plate 31, are preferably held by use of the jig, and the jig is moved in the direction diagonally to the lower right toward the circuit board 60. The four lead wires 43 are then simultaneously or substantially simultaneously bent in substantially the same direction to be arranged in the respective communicating grooves 38.

Immediately after the lead wires 43 are bent, some of the coating removed portions 44 extend beyond the corresponding pad portions 65 of the circuit board 60. Therefore, after the coating removed portions 44 of the lead wires 43 are soldered to the pad portions 65, top end portions of the coating removed portions 44 which extend beyond the corresponding pad portions 65 are cut off.

Next, the adhesives are applied to the through holes 35, the recessed portions 36, and the communicating grooves 38, and the adhesives are heated to solidify. The solidified adhesives contribute to improving the airtightness of the interior of the housing 13. The solidified adhesives also contribute to ensuring secure positioning of the lead wires 43 in the through holes 35, the recessed portions 36, and the communicating grooves 38. The operation of arranging the lead wires 43 is now complete.

Figure 7:
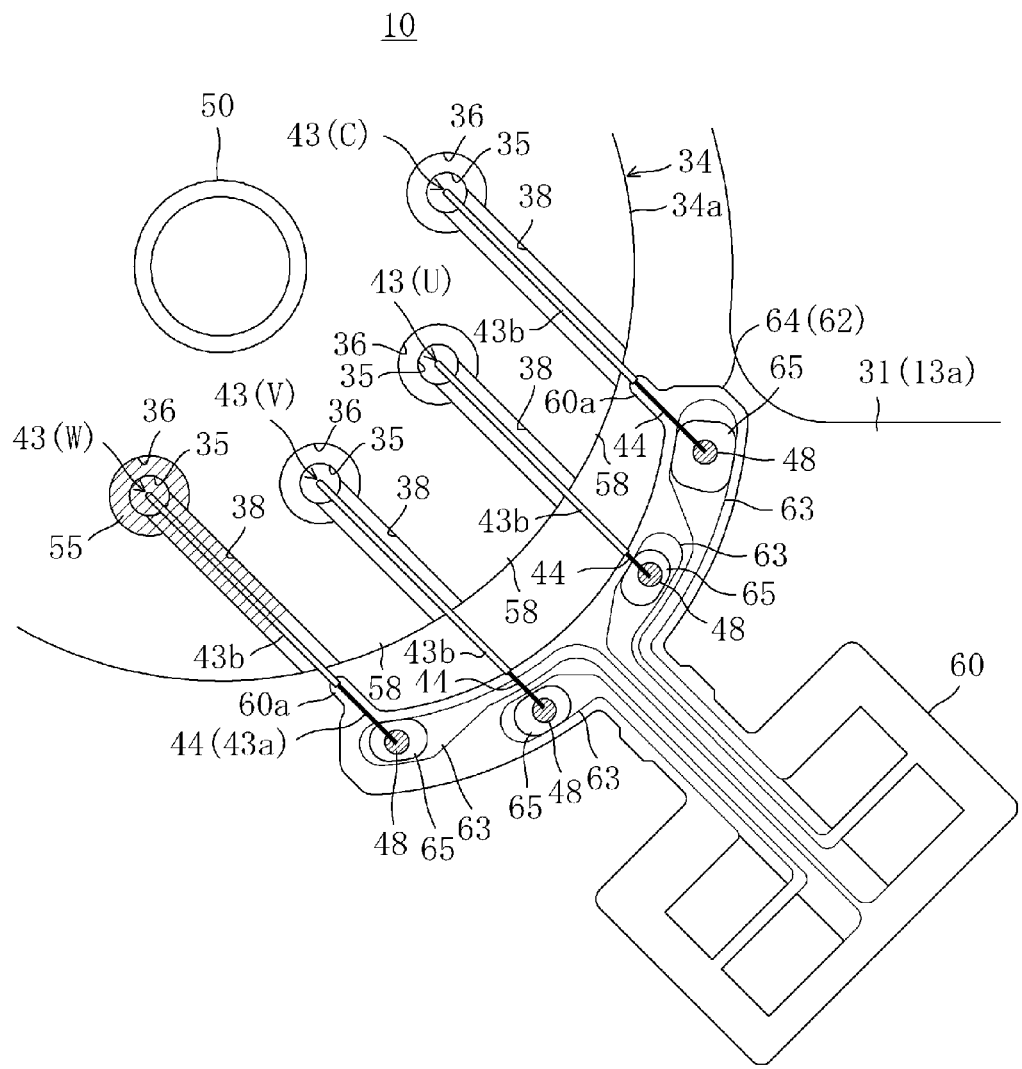
FIG. 7 is a schematic plan view illustrating an example variation of the first preferred embodiment of the present invention.

FIG. 7 is a plan view illustrating an example variation of the first preferred embodiment. As illustrated in FIG. 7, a lower surface of a base plate 31 preferably includes a thick base portion 34 arranged to spread out radially around a central axis J1. The base portion 34 preferably includes four through holes 35 corresponding to four lead wires 43 (W phase, V phase, U phase, and common) drawn from coils 42 of a stator 40. Each through hole 35 preferably has only one of the lead wires 43 passing therethrough.

A lower opening portion of a portion of the base portion 34 at which each through hole 35 is defined preferably includes a recessed portion 36 with a greater diameter than that of the through hole 35. Each recessed portion 36 has a separate one of the through holes 35 arranged therein. A wall portion 58 is arranged circumferentially between each pair of adjacent through holes 35 to divide the recessed portions 36.

The base portion 34 includes a bottom portion 34a, which includes the through holes 35, and a side wall portion 34b, which is arranged to extend upward from an outer circumferential portion of the bottom portion 34a. The bottom portion 34a preferably includes communicating grooves 38, each of which is continuous with a separate one of the recessed portions 36 near the through holes 35 and the side wall portion 34b.

A circuit board 60 is preferably arranged on a portion of the lower surface of the base plate 31 which is arranged radially outward of the base portion 34.

Each lead wire 43 is preferably arranged to pass through the corresponding through hole 35 of the base portion 34 and the corresponding communicating groove 38 to extend toward the circuit board 60. Each lead wire 43 is soldered to a corresponding pad portion 65 of the circuit board 60, and thereby electrically connected to the circuit board 60.

The through holes 35 are preferably sealed with sealants 55, and the sealants 55 are arranged in the recessed portions 36 and the communicating grooves 38. The sealants 55 include a thermosetting adhesive. The sealants 55 are arranged to secure the lead wires 43 fixedly inside the through holes 35, the recessed portions 36, and the communicating grooves 38.

Because the circuit board 60 is arranged radially outward of the base portion 34, the total amount of a portion of the bottom portion which is shaved off can be reduced, as compared to the case where an accommodating portion arranged to accommodate a portion of the circuit board is arranged in the base portion. In addition, any reduction in the rigidity of the base portion 34 can be further reduced.

Portions of a lower surface of the base portion 34 which correspond to the lead wires 43 are shaved off to define the recessed portions 36 and the communicating grooves 38 in the lower surface of the base portion 34. Therefore, the total amount of a portion of the base portion 34 which is shaved off can be reduced as compared to conventional techniques, and a sufficient rigidity of the base portion 34 can be secured. Note that the size of each recessed portion 36 is preferably a minimum size at which the lead wire 43 can be drawn out smoothly through the through hole 35, and that this arrangement will contribute to further reducing the total amount of the portion of the base portion 34 which is shaved off.

Figure 8:
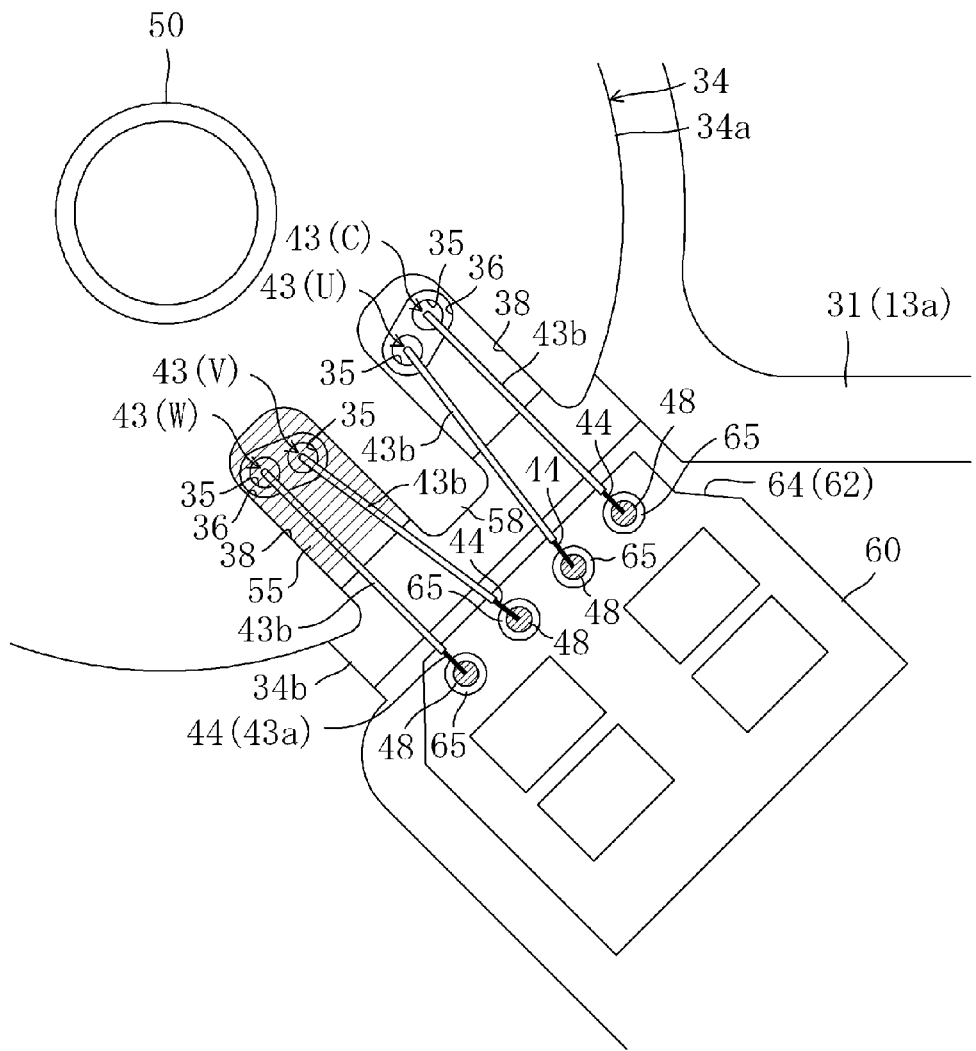
FIG. 8 is a schematic plan view illustrating the structure of a spindle motor according to a second preferred embodiment of the present invention.

FIG. 8 is a schematic plan view illustrating the structure of a spindle motor according to a second preferred embodiment of the present invention. The basic structure thereof is substantially the same as that of the first preferred embodiment, and thus, the following description focuses only on differences therebetween while portions that have their counterparts in the first preferred embodiment are denoted by the same reference numerals as those of their counterparts in the first preferred embodiment. As illustrated in FIG. 8, a lower surface of a base plate 31 preferably includes a thick base portion 34 arranged to spread out radially around a central axis J1. The base portion 34 preferably includes four through holes 35 corresponding to four lead wires 43 (W phase, V phase, U phase, and common) drawn from coils 42 of a stator 40. Each through hole 35 preferably has only one of the lead wires 43 passing therethrough.

A lower opening portion of a portion of the base portion 34 at which each through hole 35 is defined includes a recessed portion 36 with a diameter that is greater than that of the through hole 35. Specifically, the recessed portions 36 near the through holes 35 for the W and V phases preferably include a portion with a long-hole shape joining the through holes 35 to each other. In addition, the recessed portions 36 near the through holes 35 for the U phase and the common include a portion with a long-hole shape joining the through holes 35 to each other. A wall portion 58 is preferably arranged circumferentially between the pairs of through holes 35 to divide the pairs of recessed portions 36.

The base portion 34 preferably includes a bottom portion 34a, which includes the through holes 35, and a side wall portion 34b, which is arranged to extend upward from an outer circumferential portion of the bottom portion 34a. The bottom portion 34a preferably includes communicating grooves 38, which are continuous with the recessed portions 36 and the side wall portion 34b. More specifically, the bottom portion 34a preferably includes a communicating groove 38 through which the lead wires 43 drawn out through the through holes 35 for the W and V phases are arranged to pass, and a communicating groove 38 through which the lead wires 43 drawn out through the through holes 35 for the U phase and the common are arranged to pass. The circumferential width of each of these communicating grooves 38 is greater than the circumferential width of each of the communicating grooves according to the above-described preferred embodiment and the example variation thereof.

A circuit board 60 is arranged on a portion of the lower surface of the base plate 31 which is arranged radially outward of the base portion 34. The circuit board 60 is adhered to the lower surface of the base plate 31 through an adhesive layer 61 thereof.

Each lead wire 43 is preferably arranged to pass through the corresponding through hole 35 of the base portion 34 and the corresponding communicating groove 38 to extend toward the circuit board 60. Each lead wire 43 is soldered to a corresponding one of a plurality of pad portions 65 on the circuit board 60 to thereby be electrically connected to the circuit board 60.

The through holes 35 are preferably sealed with sealants 55. The sealants 55 are preferably arranged in the recessed portions 36 and the communicating grooves 38. The sealants 55 include a thermosetting adhesive. The sealants 55 are preferably arranged to secure the lead wires 43 fixedly inside the through holes 35, the recessed portions 36, and the communicating grooves 38.

Since the two wide communicating grooves 38 are preferably arranged for each of the four through holes 35, a sufficient space is secured for arrangement of each lead wire 43.

Figure 9:
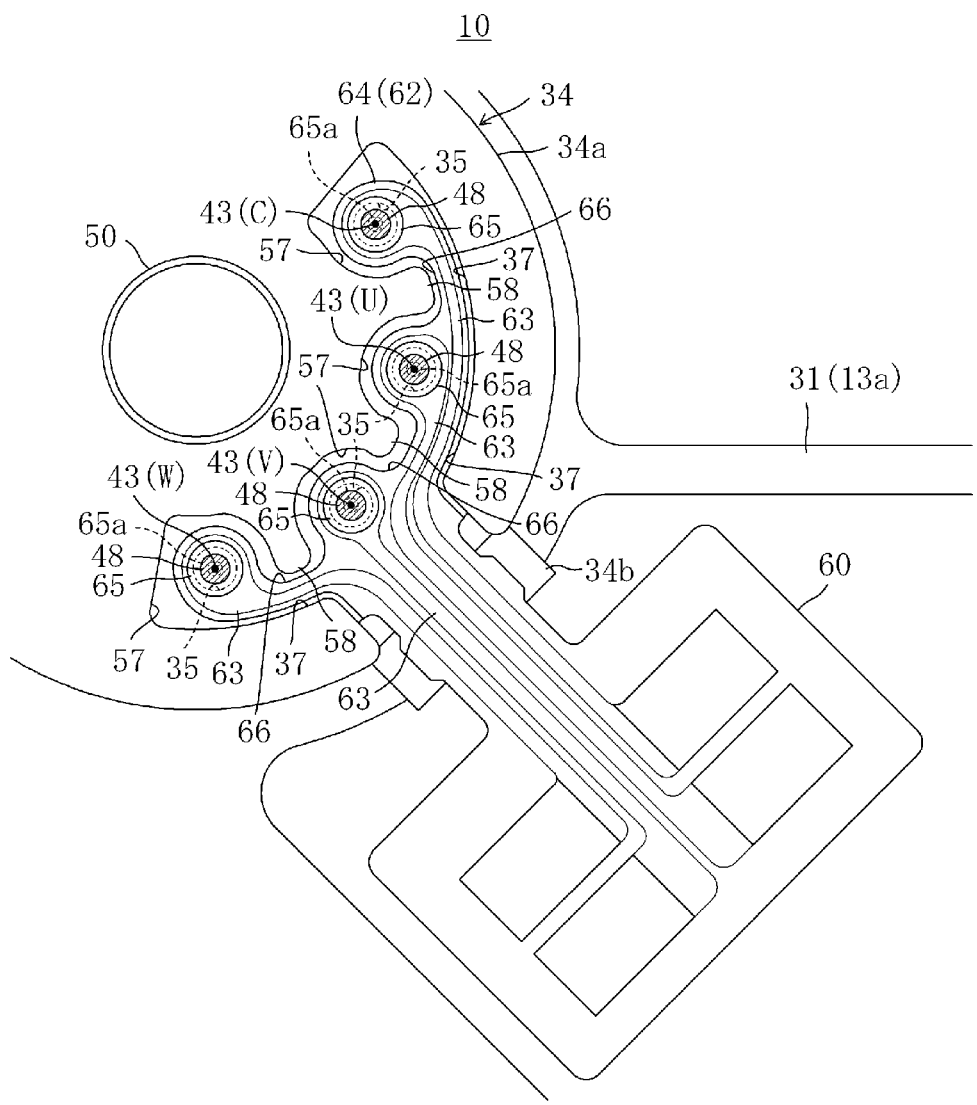
FIG. 9 is a schematic plan view illustrating the structure of a spindle motor according to a third preferred embodiment of the present invention.

FIG. 9 is a plan view illustrating the structure of a spindle motor according to a third preferred embodiment of the present invention. The basic structure thereof is substantially the same as that of the first preferred embodiment, and the following description focuses only on differences therebetween while portions that have their counterparts in the first preferred embodiment are denoted by the same reference numerals as those of their counterparts in the first preferred embodiment.

As illustrated in FIG. 9, a lower surface of a base plate 31 preferably includes a thick base portion 34 arranged to spread out radially around a central axis J1. The base portion preferably includes a bottom portion 34a and a side wall portion 34b, which is arranged to extend upward from an outer circumferential portion of the bottom portion 34a. The bottom portion 34a preferably includes four recessed portions 57. Each recessed portion 57 preferably has one through hole 35 arranged therein.

The recessed portions 57 are arranged in communication with one another through an accommodating portion 37 which is arranged radially outward of the through holes 35. The accommodating portion 37 is arranged to extend in the circumferential direction. A wall portion 58 is arranged circumferentially between each pair of adjacent through holes 35 to divide the recessed portions 57.

A portion of a circuit board 60 is preferably arranged to extend in the circumferential direction inside the accommodating portion 37. A groove portion 66 is preferably arranged radially inward of the circuit board 60 to be opposite each of the wall portions 58.

In the third preferred embodiment, a pad portion 65 of the circuit board 60, in addition to the through hole 35, is arranged in each recessed portion 57. Each pad portion 65 preferably includes a pad hole 65a which is arranged to overlap with a corresponding one of the through holes 35 in the axial direction. The diameter of the pad hole 65a is preferably smaller than the diameter of the through hole 35. Each through hole 35 preferably has only one of the lead wires 43 passing therethrough. Each lead wire 43 is arranged to pass through the corresponding pad hole 65a to reach the lower surface of the base portion 34. The lead wire 43, which has reached the lower surface of the base portion 34, is soldered to the pad portion 65 of the circuit board 60, and thereby electrically connected to the circuit board 60. Each pad hole 65a is sealed with a solder 48.

According to the above-described structure in which a plurality of recessed portions 57 are arranged in the lower surface of the base portion 34, portions of the lower surface of the base portion 34 which correspond to the lead wires 43 are shaved off to define the plurality of recessed portions 57 in the lower surface of the base portion 34. Therefore, the total amount of a portion of the base portion 34 which is shaved off can be reduced as compared to conventional techniques, and a sufficient rigidity of the base portion 34 can be achieved. Note that the size of each recessed portion 57 is preferably a minimum size that allows the lead wire 43 to be drawn out smoothly through the through hole 35. This arrangement will contribute to further reducing the total amount of the portion of the base portion 34 which is shaved off. Furthermore, the wall portion 58 arranged between each pair of adjacent through holes 35 contributes to achieving a sufficient rigidity of the base portion 34.

Furthermore, the covering of each through hole 35 with the pad portion 65 of the circuit board 60 and the sealing of the pad hole 65a with the solder 48 will contribute to improving the airtightness. This prevents a gas or the like from entering or exiting the interior of a housing 13 of a hard disk drive apparatus 1 through any through hole 35. Note that the airtightness can be further ensured by arranging a sealant in each recessed portion 57 and covering the solder 48 with the sealant.

As in the first preferred embodiment, a thermosetting adhesive is preferably used as the sealant. Note, however, that the sealant may be made of any of various types of adhesives, such as an ultraviolet cure adhesive, instead of the thermosetting adhesive. Also note that the sealant may not necessarily be an adhesive, as long as the airtightness can be achieved. For example, a non-adhesive sealant that is in a liquid or gel state when applied may be used.

Figure 10:
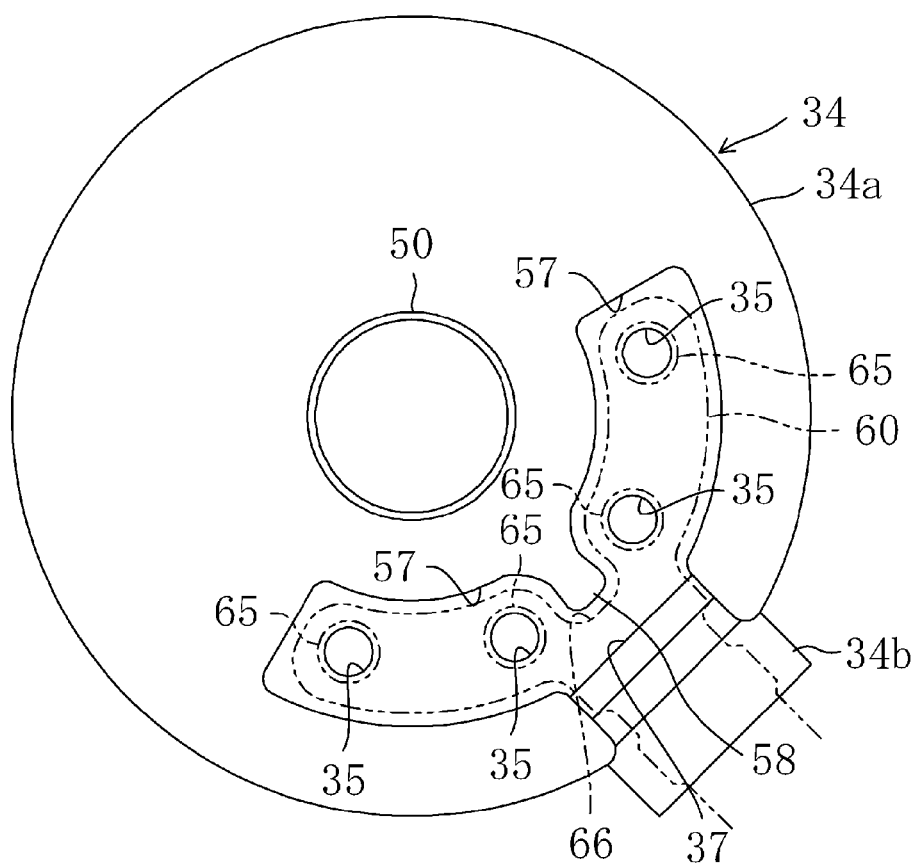
FIG. 10 is a schematic plan view illustrating a first example variation of the third preferred embodiment of the present invention.

FIG. 10 is a schematic plan view illustrating a first example variation of the third preferred embodiment. As illustrated in FIG. 10, a base portion 34 preferably includes a bottom portion 34a and a side wall portion 34b, which is arranged to extend upward from an outer circumferential portion of the bottom portion 34a. The bottom portion 34a includes two recessed portions 57. Two through holes 35 are arranged in each recessed portion 57.

The recessed portions 57 are arranged in communication with each other through an accommodating portion 37 which is arranged radially outward of the through holes 35. A wall portion 58 is preferably arranged between the through holes 35 in each recessed portion 57 to divide the recessed portions 57. Note that the number of through holes 35 arranged in each recessed portion 57 is not limited to two, but that it is enough that each recessed portion 57 include at least one through hole 35.

In addition to the through holes 35, pad portions 65 of a circuit board 60 are preferably arranged inside the recessed portions 57. A groove portion 66 is preferably arranged radially inward of the circuit board 60 to be opposite the wall portion 58.

Figure 11:
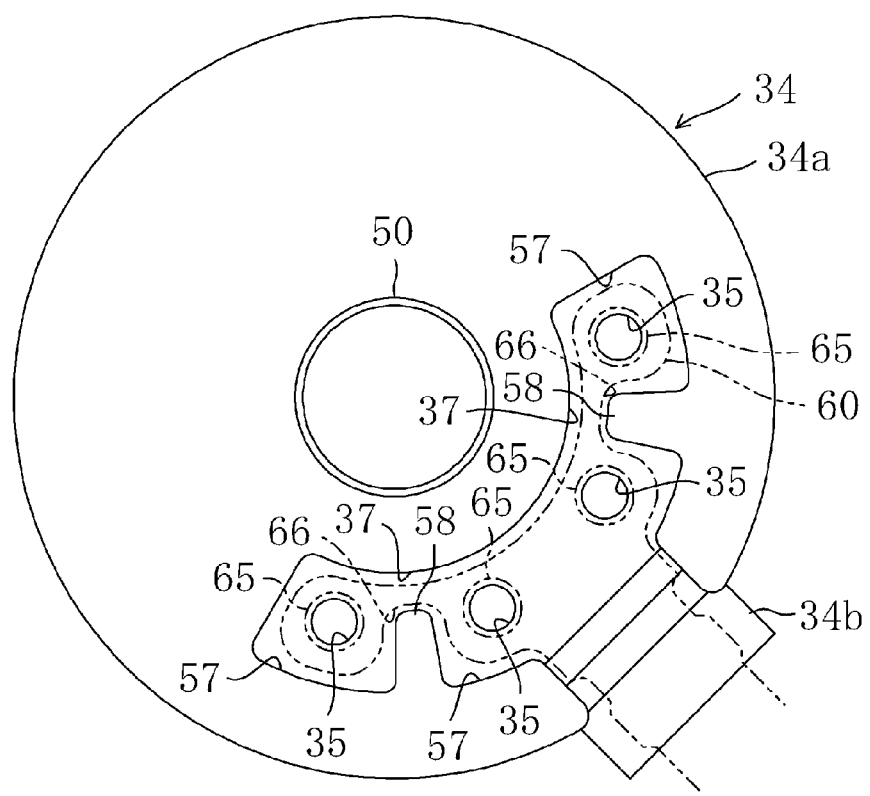
FIG. 11 is a schematic plan view illustrating a second example variation of the third preferred embodiment of the present invention.

FIG. 11 is a plan view illustrating a second example variation of the third preferred embodiment. As illustrated in FIG. 11, a base portion 34 includes a bottom portion 34a and a side wall portion 34b, which is arranged to extend upward from an outer circumferential portion of the bottom portion 34a. The bottom portion 34a preferably includes three recessed portions 57. One through hole 35 is preferably arranged in each of two of the recessed portions 57 which are positioned on both sides in the circumferential direction of the base portion 34. Two through holes 35 are preferably arranged in the recessed portion which is positioned in the middle in the circumferential direction.

The recessed portions 57 are preferably arranged in communication with one another through an accommodating portion 37 which is arranged radially inward of the through holes 35. Wall portions 58 are preferably arranged between the through holes 35 in each recessed portion 57 to divide the recessed portions 57. Note that the arrangement of the wall portions 58 is not limited to the arrangement illustrated in FIG. 11, but that the number of wall portions 58 and/or the arrangement thereof may be varied.

In addition to the through holes 35, pad portions 65 of a circuit board 60 are preferably arranged inside the recessed portions 57. A groove portion 66 is preferably arranged radially outward of the circuit board 60 to be opposite each of the wall portions 58.

While the spindle motors according to preferred embodiments of the present invention and example variations thereof have been described above, the present invention is not limited to the preferred embodiments and the example variations thereof described above, but various variations and modifications are possible without departing from the scope of the present invention.

While a total of four through holes 35 are preferably provided for the four lead wires 43 (for the W phase, the V phase, the U phase, and the common) according to the above-described preferred embodiments, the number of through holes 35 may be one or any number greater than one in other preferred embodiments of the present invention.

For example, the four lead wires may be drawn out through a single through hole, or alternatively, two of the lead wires may be drawn out through each of two through holes provided. Also, it may be so arranged that two through holes are provided, and that one lead wire is drawn out through one of the through holes while a plurality of lead wires are drawn out through the other through hole. For example, it may be so arranged that the common wire is drawn out through one of the two through holes while three lead wires for the U phase, the V phase, and the W phase, respectively, are drawn out through the other through hole.

Also note that the number of lead wires 43 is not limited to four, and that a total of three lead wires may be provided for the U phase, the V phase, and the W phase, respectively, for example.

In the above-described preferred embodiments, the distance from each of the through holes 35 for the W phase and the common to the corresponding pad portion 65 of the circuit board 60 is preferably longer than the distance from each of the through holes 35 for the V phase and the U phase to the corresponding pad portion 65. Accordingly, the projecting portions 60a of the circuit board 60 are arranged between the base plate 31 and the coating removed portions 44 of the lead wires 43 for the W phase and the common to achieve insulation. However, when the distance from each through hole 35 to the corresponding pad portion 65 is arranged to be substantially equal, the arrangement of the projecting portions 60a is not necessary from the viewpoint of the insulation between the base plate and the coating removed portions.

Furthermore, the structure in which the insulating bushing 45 is arranged in each through hole 35 to prevent the lead wire 43 from coming into electrical contact with the base plate 31 has been described above. Note, however, that an insulation sheet or other preferable insulating material may be arranged between the stator 40 and the base plate 31, for example.

Furthermore, while the base plate 31 and the housing 13 are preferably defined by a single member in the above-described preferred embodiments, the base plate 31 and the housing 13 may be defined by separate members in other preferred embodiments of the present invention.

Furthermore, while the spindle motors 10 used in the preferred embodiments described above are preferably of the outer-rotor type, inner-rotor motors may be used in other preferred embodiments of the present invention.

Furthermore, the bearing mechanism 25 in the motor 10 is not limited to a bearing mechanism using fluid dynamic pressure, but other types of plain bearings or other bearings having different structures may be used in other preferred embodiments of the present invention.

Also note that the circuit board is not limited to the flexible circuit board, but that a variety of circuit boards may be used in other preferred embodiments of the present invention. For example, a rigid board such as a connector may be used in other preferred embodiments of the present invention.

As described above, the present invention is able to produce a beneficial effect of high practicability, that is, enabling a spindle motor and a disk drive apparatus including the spindle motor to secure a sufficient rigidity of the base portion, and the present invention is therefore extremely useful and has high industrial applicability.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A spindle motor comprising:
    a base portion including at least two through holes and arranged to spread out radially around a central axis;
    a rotor hub arranged above the base portion to rotate about the central axis;
    a stator arranged above the base portion, and including coils each including at least one lead wire; and
    a circuit board arranged radially outward of the at least two through holes; wherein
    the base portion includes a communicating groove arranged to join the at least two through holes and the circuit board to each other, a width of the communicating groove in a circumferential direction is smaller than a straight-line distance between centers of adjacent ones of the at least two through holes;
    the at least one lead wire of the coils is arranged to pass inside the at least two through holes and the communicating groove to be electrically connected to the circuit board; and
    the at least two through holes are sealed with a sealant.

2. The spindle motor according to claim 1, wherein the base portion includes a recessed portion with a greater diameter than a diameter of one of the at least two through holes, the recessed portion being arranged at a lower opening portion of a portion of the base portion at which the at least two through holes are defined.

3. The spindle motor according to claim 2, wherein
    the recessed portion is continuously arranged with the communicating groove;
    the sealant includes an adhesive; and
    the sealant is arranged inside the recessed portion and the communicating groove.

4. The spindle motor according to claim 1, wherein
    one of the at least two through holes is arranged to have only one of the at least one lead wire passing therethrough.

5. The spindle motor according to claim 1, wherein
the at least one lead wire includes at least two lead wires equal in number to the at least two through holes;
each of the at least two through holes is arranged to have only one of the at least two lead wires passing therethrough; and
each of the at least two lead wires is arranged to extend in substantially the same direction toward the circuit board.

6. The spindle motor according to claim 1, wherein
the circuit board includes a first insulating layer, a conductive layer arranged on the first insulating layer to be electrically connected with the at least one lead wire, and a second insulating layer arranged to cover the conductive layer while exposing a portion or portions of the conductive layer;
each coil includes a conducting wire and an insulating coating with which the conducting wire is coated;
a top end portion of each of the at least one lead wire of the coils includes a coating removed portion where the insulating coating has been removed; and
at least the first insulating layer of the circuit board is arranged between the coating removed portion and the base portion.

7. A disk drive apparatus including a recording disk, the disk drive apparatus comprising:
the spindle motor of claim 1 arranged to rotate the recording disk;
an access portion arranged to read and/or write information from or to the recording disk; and
a housing defined by a first housing portion and a second housing portion, the first housing portion including the base portion, the housing being arranged to contain the spindle motor and the access portion.

8. The spindle motor according to claim 1, wherein adjacent pairs of the at least two through holes include a wall portion arranged therebetween.

9. A spindle motor comprising:
a base portion including a through hole and arranged to spread out radially around a central axis;
a rotor hub arranged above the base portion to rotate about the central axis;
a stator arranged above the base portion, and including coils each including at least one lead wire; and
a circuit board arranged radially outward of the through hole; wherein
the base portion includes a communicating groove arranged to join the through hole and the circuit board to each other;
the at least one lead wire of the coils is arranged to pass inside the through hole and the communicating groove to be electrically connected to the circuit board;
the through hole is sealed with a sealant;
the base portion includes a bottom portion in which the through hole is arranged, and a side wall portion arranged to extend upward from an outer circumferential portion of the bottom portion;
the bottom portion includes an accommodating portion arranged to be depressed upward and continuous with the communicating groove; and
the circuit board includes at least one pad portion arranged to be connected with the at least one lead wire, and arranged inside the accommodating portion.

10. The spindle motor according to claim 9, wherein
the at least one lead wire is fixed to the at least one pad portion through a solder; and
a total depth of depression of the accommodating portion is greater than a sum of a thickness of the circuit board and a thickness of the solder.

11. The spindle motor according to claim 9, wherein the base portion includes a recessed portion with a greater diameter than a diameter of the through hole, the recessed portion being arranged at a lower opening portion of a portion of the base portion at which the through hole is defined.

12. The spindle motor according to claim 11, wherein
the recessed portion is continuously arranged with the communicating groove;
the sealant includes an adhesive; and
the sealant is arranged inside the recessed portion and the communicating groove.

13. The spindle motor according to claim 9, wherein
the base portion includes a plurality of through holes arranged therein; and
one of the plurality of through holes is arranged to have only one of the at least one lead wire passing therethrough.

14. The spindle motor according to claim 13, wherein adjacent pairs of the plurality of the through holes includes a wall portion arranged therebetween.

15. The spindle motor according to claim 9, wherein
the base portion includes at least two through holes arranged therein;
the at least one lead wire includes at least two lead wires equal in number to the at least two through holes;
each of the at least two through holes is arranged to have only one of the at least two lead wires passing therethrough; and
each of the at least two lead wires is arranged to extend in substantially the same direction toward the circuit board.

16. The spindle motor according to claim 9, wherein
the circuit board includes a first insulating layer, a conductive layer arranged on the first insulating layer to be electrically connected with the at least one lead wire, and a second insulating layer arranged to cover the conductive layer while exposing a portion or portions of the conductive layer;
each coil includes a conducting wire and an insulating coating with which the conducting wire is coated;
a top end portion of each of the at least one lead wire of the coils includes a coating removed portion where the insulating coating has been removed; and
at least the first insulating layer of the circuit board is arranged between the coating removed portion and the base portion.

17. A disk drive apparatus including a recording disk, the disk drive apparatus comprising:
the spindle motor of claim 9 arranged to rotate the recording disk;
an access portion arranged to read and/or write information from or to the recording disk; and
a housing defined by a first housing portion and a second housing portion, the first housing portion including the base portion, the housing being arranged to contain the spindle motor and the access portion.

18. A disk drive apparatus including a recording disk, the disk drive apparatus comprising:
an access portion arranged to read and/or write information from or to the recording disk;
a spindle motor comprising:
a base portion including a plurality of through holes and arranged to spread out radially around a central axis;
a rotor hub arranged above the base portion to rotate about the central axis;

a stator arranged above the base portion, and including coils each including at least one lead wire; and
a circuit board including at least one pad portion; and
a housing including a first housing portion and a second housing portion, the housing being arranged to contain the spindle motor and the access portion; wherein
the base portion includes a plurality of recessed portions arranged on a lower surface thereof;
each of the recessed portions is arranged to have at least one of the through holes arranged therein;
the at least one lead wire is arranged to pass through the through holes to reach the lower surface of the base portion, and to be electrically connected to the at least one pad portion of the circuit board;
the spindle motor is arranged to rotate the recording disk; and
the first housing portion includes the base portion.

19. The disk drive apparatus according to claim 18, wherein the at least one pad portion is arranged inside the recessed portions.

20. The disk drive apparatus according to claim 19, wherein
each of the at least one pad portion includes a pad hole arranged to overlap with a corresponding one of the through holes in an axial direction;
each of the at least one lead wire is arranged to reach a lower surface of a separate one of the at least one pad portion through the pad hole thereof, and to be fixed to the pad portion through a solder; and
the pad hole is sealed with the solder.

21. The disk drive apparatus according to claim 20, wherein the solder is covered with a sealant.

22. The disk drive apparatus according to claim 18, wherein each of the through holes is arranged to have only one of the at least one lead wire passing therethrough.

23. The disk drive apparatus according to claim 18, wherein each of the recessed portions is arranged to have one of the through holes arranged therein.

24. The disk drive apparatus according to claim 18, wherein each pair of adjacent ones of the through holes includes a wall portion arranged therebetween.

25. The disk drive apparatus according to claim 18, wherein the base portion includes a recessed portion with a greater diameter than a diameter of the through hole, the recessed portion being arranged at a lower opening portion of a portion of the base portion at which the through hole is defined.

26. The disk drive apparatus according to claim 25, further comprising:
a communicating groove including a sealant; wherein
the recessed portion is continuously arranged with the communicating groove;
the sealant includes an adhesive; and
the sealant is arranged inside the recessed portion and the communicating groove.

27. The disk drive apparatus according to claim 18, wherein
the base portion includes a plurality of through holes arranged therein; and
one of the plurality of through holes is arranged to have only one of the at least one lead wire passing therethrough.

28. The disk drive apparatus according to claim 27, wherein each pair of adjacent ones of the at least two through holes includes a wall portion arranged therebetween.

29. The disk drive apparatus according to claim 18, wherein the base portion includes a at least two of the plurality of through holes arranged therein;
the at least one lead wire includes at least two lead wires equal in number to the at least two through holes;
each of the at least two through holes is arranged to have only one of the at least two lead wires passing therethrough; and
each of the at least two lead wires is arranged to extend in substantially the same direction toward the circuit board.

30. The disk drive apparatus according to claim 18, wherein
the circuit board includes a first insulating layer, a conductive layer arranged on the first insulating layer to be electrically connected with the at least one lead wire, and a second insulating layer arranged to cover the conductive layer while exposing a portion or portions of the conductive layer;
each coil includes a conducting wire and an insulating coating with which the conducting wire is coated;
a top end portion of each of the at least one lead wire of the coils includes a coating removed portion where the insulating coating has been removed; and
at least the first insulating layer of the circuit board is arranged between the coating removed portion and the base portion.

31. A spindle motor comprising:
a base portion including a plurality of through holes arranged therein and arranged to spread out radially around a central axis;
a rotor hub arranged above the base portion to rotate about the central axis;
a strator arranged above the base portion, and including coils at least two lead wires; and
a circuit board arranged radially outward of the plurality of through holes wherein
the base portion includes at least one communicating groove arranged to join the plurality of the through holes and the circuit board to each other;
the at least two lead wires of the coils are arranged to pass inside the plurality of the through holes and the at least one communicating groove to be electrically connected to the circuit board;
the plurality of the through holes is sealed with sealant;
the at least two lead wires are equal in number to the plurality of the through holes;
each of the plurality of the through holes is arranged to have only one of the least two lead wires passing therethrough; and
each of the at least two lead wires is arranged to extend in substantially the same direction toward the circuit board.

32. The spindle motor according to claim 31, wherein the base portion includes a recessed portion with a greater diameter than a diameter of one of the at least two through holes, the recessed portion being arranged at a lower opening portion of a portion of the base portion at which the at least two through holes are defined.

33. The spindle motor according to claim 32, wherein
the recessed portion is continuously arranged with the communicating groove;
the sealant includes an adhesive; and
the sealant is arranged inside the recessed portion and the communicating groove.

34. The spindle motor according to claim 31, wherein
the circuit board includes a first insulating layer, a conductive layer arranged on the first insulating layer to be electrically connected with the at least one lead wire, and a second insulating layer arranged to cover the conductive layer while exposing a portion or portions of the conductive layer;

each coil includes a conducting wire and an insulating coating with which the conducting wire is coated;

a top end portion of each of the at least one lead wire of the coils includes a coating removed portion where the insulating coating has been removed; and at least the first insulating layer of the circuit board is arranged between the coating removed portion and the base portion.

35. A disk drive apparatus including a recording disk, the disk drive apparatus comprising:

the spindle motor of claim 31 arranged to rotate the recording disk;

an access portion arranged to read and/or write information from or to the recording disk; and a housing defined by a first housing portion and a second housing portion, the first housing portion including the base portion, the housing being arranged to contain the spindle motor and the access portion.

36. The spindle motor according to claim 31, wherein each pair of adjacent ones of the at least two through holes includes a wall portion arranged therebetween.

* * * * *